May 1, 1945.  W. P. WILLS  2,375,159

MEASURING AND CONTROL APPARATUS

Original Filed April 23, 1942

*INVENTOR.*
WALTER P. WILLS
BY
CBSpangenberg
ATTORNEY.

Patented May 1, 1945

2,375,159

UNITED STATES PATENT OFFICE 2,375,159

MEASURING AND CONTROL APPARATUS

Walter P. Wills, Philadelphia, Pa., assignor to The Brown Instrument Company, Philadelphia, Pa., a corporation of Pennsylvania Original application April 23, 1942, Serial No. 440,163. Divided and this application July 3, 1943, Serial No. 493,349

3 Claims. (Cl. 236—74)

The general object of the present invention is to provide improved measuring and control apparatus adapted to take account of and give effect both to the magnitude and to the rate of change of a quantity measured or controlled. While not limited to such use, the invention may be used with especial advantage in many industrial heating processes in which a close regulation of a furnace or work temperature is desirable, and in which the corrective variation in the furnace heat supply made on a change in the controlling temperature should be suitably related to the rate of change in, as well as to the magnitude of the controlling temperature, if objectionable hunting is to be avoided.

A specific object of the invention is to combine a single thermocouple with a condenser and resistance into an element responsive both to the temperature of the thermocouple and to the rate of change of that temperature. The responsive element thus produced maintains a potential difference between its terminals which is proportional to the temperature of the thermocouple when that temperature is steady, and which on the occurrence of, and immediately following, a change in said temperature is modified in a manner depending on the rate of said change. One important practical advantage of said responsive element is that the potential difference which it maintains is of a character to be readily measured by potentiometric measuring means operating on the null principle.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a desirable embodiment of my invention.

Figure 1:
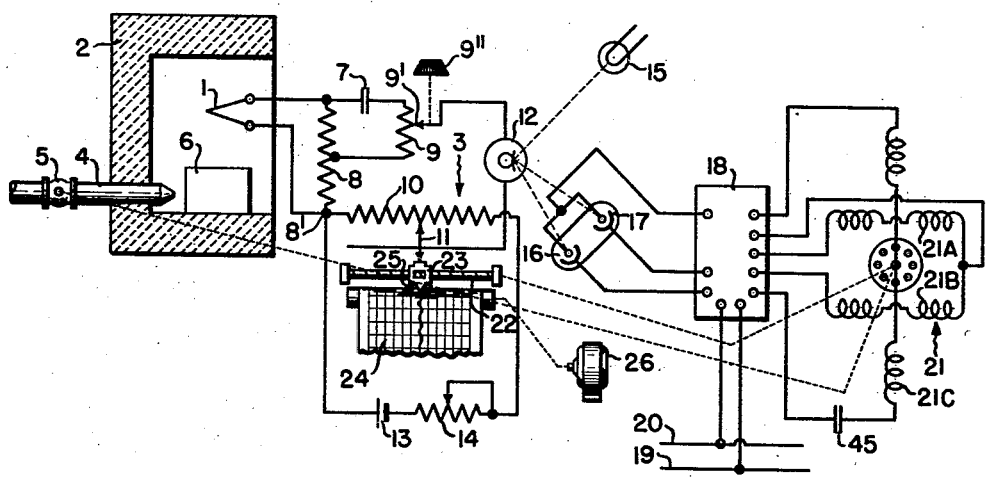
Fig. 1 is a diagrammatic representation of an embodiment of the invention.

Fig. 1 diagrammatically illustrates the use of a desirable form of the present invention in which a single thermocouple 1 extending into the heating chamber of a work heating furnace 2 is associated with measuring and control apparatus 3 employed to regulate the rate at which heat is supplied to the furnace by adjustment of a valve 5 in the furnace fuel supply pipe 4 in joint response to the furnace temperature and to a furnace temperature rate of change as required for the proper heating of work 6 in the furnace chamber.

The thermocouple 1 has one terminal directly connected to one terminal of a condenser 7 and has its two terminals directly connected by a resistance 8. The second terminal of the condenser 7 is connected through a resistance 9 to the resistance 8 intermediate its ends. That point may well be and as shown is midway between the ends of the resistance 8. A contact 9' engages the resistance 9 at a point along the length of the latter which may be adjusted by means of a suitable element 9" shown diagrammatically in Fig. 1.

The thermocouple 1, condenser 7, and resistances 8 and 9 combined as described, constitute a temperature responsive element which has one terminal 8' at the junction of one terminal of the thermocouple 1 with the end of the resistance 8 remote from the condenser 7, and the second terminal of which is formed by the contact 9'. In its normal use, illustrated in Fig. 1, said responsive element operates to maintain a potential difference between its terminals 8' and 9' which is proportional to the temperature of the thermocouple 1 when that temperature is steady, and which on a change in said temperature is varied both in accordance with the magnitude of said change and in accordance with the rate of said change.

The resistance 8 acts as a voltage divider operating through the resistance 9 to impress the voltage drop in its lower portion on a measuring circuit including the terminals 8' and 9'. That voltage drop is normally equal to half of the voltage of the thermocouple 1 if the lower terminal of the resistance 9 is connected to the resistance 8 at the midpoint of the latter as shown in Fig. 1. A change in the temperature, and thereby in the voltage of the thermocouple 1, produces a current flow which charges or discharges the condenser 7, and thereby produces a temporary voltage drop in the resistance 9 which forms a measure of the rate of change of the temperature of the thermocouple 1. While the condenser 7 is thus being charged or discharged, the potential difference maintained between the terminals 8' and 9' is the algebraic sum, or resultant, of the potential drop in the lower half of the resistance 8 and the potential drop in that portion of the resistance 9 which is connected at its lower end to the midpoint of the resistance 8 and which is connected at its other end to the contact 9'.

The voltage drop in the resistance 9 is in the direction to increase the potential difference between contacts 8' and 9' when it results from an increase in the temperature and voltage of the thermocouple 1, and is in the direction to decrease that potential difference when it results from a decrease in the thermocouple voltage and temperature. When following a change in the temperature of the thermocouple 1, the voltage of the latter remains constant for a period long enough for the potential of the condenser 7 to become equal to the potential drop in the upper half of the resistance 8, so that there is no longer any condenser charging or discharging current flow through the resistance 9, the potential difference between the terminals 8' and 9' again become equal to the voltage drop in the lower half of the resistance 8, provided the condition of the measuring circuit in which said terminals are connected is then such as to prevent current flow between said terminals through the lower portion of the resistor 9.

Figure 2:
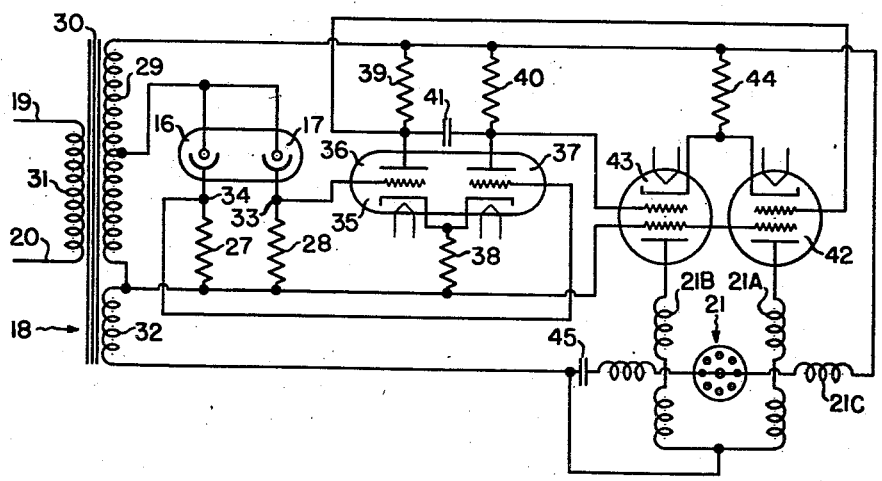
Fig. 2 is a diagrammatic representation of details of an electronic amplifier included in the apparatus shown in Fig. 1.

The potential difference between the terminals 8' and 9' of the responsive element including the thermocouple 1, condenser 7 and resistances 8 and 9, is of a character to be measured by potentiometric means 3 of a self-balancing type operating on the null principle, and one form of such means is diagrammatically shown by Figs. 1 and 2. The measuring means shown comprises a slide wire resistor 10 connected at one end to the responsive terminal element 8', and engaged at an adjustable point along its length by a contact 11. The latter is connected to the second terminal 9' of the responsive element through a galvanometer 12 of the deflecting mirror type. The slide wire resistor 10 is energized by a battery 13 connected in series with said resistor 10 through a resistance 14 adjustable to maintain the desired potential drop in said resistor.

As shown in Fig. 1, the mirror galvanometer 12 reflects light from a light source 15 onto photoelectric cells 16 and 17 which, as shown, are enclosed in a common envelope, and are connected to the input terminals of an electronic amplifier 18. The latter, as shown in Fig. 2 and hereinafter described in detail, is energized from alternating current supply conductors 19 and 20, and has its output terminals connected to the terminals of a reversible motor 21.

When the potentiometric measuring circuit is balanced and the galvanometer 12 occupies its neutral of intermediate deflective position, equal amounts of light are reflected onto the cells 16 and 17, and the motor 21 is not energized for rotation in either direction and remains stationary. However, when the measuring circuit is unbalanced, the galvanometer deflects out of its neutral position, and one of the cells 16 or 17 receives more light than the other. The motor 21 is then energized for rotation in a direction dependent on which cell receives the more light. The motor 21 is mechanically connected to and rotates the threaded pen carriage shaft 22 of the instrument 3 and thereby adjusts the pen carriage 23 longitudinally of said shaft. The pen carriage 23 carries the contact 11 which is moved by the carriage in the direction to rebalance the potentiometer circuit. The pen carriage also supports a recording pen 25 which traces a record of the pen carriage movement on a record strip or chart 24. When the potentiometer is balanced, the length of the portion of the slide wire 9 at the left of the contact 11 in Fig. 1 is such that the potential drop in said portion, due to the current flow produced by the battery 13, is equal in magnitude and opposite in direction to the potential impressed on said slide wire by the circuit branch including the responsive element terminals 8' and 9' and the galvanometer 12.

On a subsequent increase or decrease in the furnace temperature, the potential impressed on the slide wire portion by the said circuit branch is increased or decreased as a result of the increase or decrease in the voltage of the thermocouple 1 and the resultant increase or decrease in the potential drop in the lower half of the resistance 8, and is further increased or decreased by the potential drop in the resistance 9 produced by the condenser charging or discharging current flow resulting from the change in the thermocouple voltage. When the potentiometer is thus unbalanced, the motor 21 operates in the direction to move the contact 11 to the right or to the left as required to rebalance the potentiometer.

The increased or decreased voltage of the thermocouple 1, due to the above mentioned change in furnace temperature, is maintained until a further change in the furnace temperature occurs. If following its initial change, the furnace temperature remains constant for a period, the condenser charging or discharging current 1 will correspondingly vary the potential of the condenser 7 and then die out. As the condenser current thus dies out, the portion of the potential drop in the resistance 9 created by the condenser current will also die out, and thus have the effect of producing a reverse potential rebalancing operation of the motor 21, and a return movement of the contact 11 into the position in which it correctly indicates the existing temperature of the thermocouple 1.

The motor 21 is operatively connected to the fuel valve 5 to give the latter an opening or closing adjustment, accordingly as the motor rotation is in the direction to adjust the contact 11 toward the left or low temperature end of its range of movement, or toward the opposite end of that range.

As will be apparent, the potential drop in the resistance 9 in one direction produced by a condenser charging current, or in the opposite direction produced by a condenser discharging current, is in each case proportional to the magnitude of the current and, hence, in each case is directly proportional to the rate of change in furnace temperature. As has been made apparent, on a change in the furnace temperature, the thermocouple 1 of Fig. 1 operates through the resistance 9 to temporarily increase the corrective adjustment which it operates to produce through the resistance 8.

As is well known to those skilled in the control art, the production of a corrective control effect immediately on a change in a control condition, followed by a delayed control effect opposite in direction to, but smaller in magnitude than the first effect, is conducive to close regulation with little or no hunting tendency, provided the two control effects are suitably proportioned with respect to the controlling condition change giving rise to those effects and to the characteristics of the furnace heating operation or other process in which the control effects are used. The provision of the adjustable contact 9', as shown, facilitates such proportioning of the two control effects. For optimum results in the use of the invention in the form shown, the values of the resistance 8 and of the condenser 7 should be suitably related to the operating characteristics of the furnace.

The furnace characteristics which thus have to be taken into account depend upon such matters as the heat storage capacity of the furnace walls, the heat absorbing capacity of the work, and the furnace and work temperatures. Merely by way of illustration and example, I note that when the instrument 3 is used in measuring and recording furnace temperature conditions in a furnace installation of a type in which such instrument may be used with advantage, the resistance 8 may well have a value of 200 ohms and the condenser 7 may well have a value of 4,000 mfd.

The electronic amplifier 18 employed in the arrangement shown in Fig. 1 may take various forms, one suitable form being illustrated in Fig. 2. As shown in Fig. 2 the photocells 16 and 17 are connected in a bridge circuit, one branch of which includes the cell 16 and a resistance 27 while the other branch includes the cell 17 and a resistance 28. The bridge circuit receives energizing current from a section of the secondary winding 29 of a transformer 30, which has its primary winding 31 connected to and energized by alternating current supply conductors 19 and 20. The transformer also includes an additional secondary winding 32, the purpose of which is hereinafter explained.

The terminals or junctions 33 and 34 of the bridge circuit which normally have the same potential, are connected to the input circuit of an electronic valve 35 of the twin type including two triodes in one envelope. Thus, as shown, the bridge terminal 33 is connected to the control grid of the triode 36 and the terminal 34 is connected to the control grid of the triode 37. The cathodes of the two triodes are connected through a common biasing resistance 38 to the terminals of the resistances 27 and 28, respectively, remote from the photoelectric cells 16 and 17. Plate energizing current is supplied to the triodes 36 and 37 by the transformer secondary winding 29. As shown, the plate circuit of the triode 36 includes a resistance 39 connecting the upper end of the winding 29 to the plate of the triode 36, and a connection including the resistance 38 between the cathode of triode 36 and the lower end of the secondary 29. The plate circuit for the triode 37 differs from that for the triode 36 only in that the plate of triode 37 is connected to the upper end of the transformer secondary 29 by a resistance 40. A condenser 41 of suitable value is connected between the ends of the resistances 39 and 40, respectively adjacent the plates of the triodes 36 and 37.

When the photocells 16 and 17 are equally illuminated, the triodes 36 and 37 will be equally conductive and the potential drop across the resistance 39 will be equal to that across the resistance 40. Upon an increase in the illumination of the photocell 16 relative to that of the photocell 17, the triode 37 will be rendered more conductive than the triode 36 and the potential drop across resistance 40 will then exceed that across resistance 39. Conversely, when the illumination of the photocell 17 exceeds that of the photocell 16, the potential drop across resistance 39 will exceed that across resistance 40.

The potential drop across the resistance 39 is impressed on the input circuit of an electronic valve 42, and the potential drop across the resistance 40 is impressed on the input circuit of an electronic valve 43. The valves 42 and 43 are shown as screen grid type tetrodes, receiving energizing current from the transformer secondary windings 29 and 32 which are connected in series so that their voltages are additive. As shown, the plate circuit of the tetrode 42 includes one winding 21A of the motor 21 through which the anode of the valve 42 is connected to the lower terminal of the secondary winding 32, and a cathode biasing resistance 44 connecting the cathode of the valve 42 to the upper end of the secondary winding 29. The plate circuit of the tube 43 includes the winding 21B of the motor 21 through which the anode of valve 43 is connected to the lower end of the secondary winding 32, and includes the resistance 44 through which the cathode of the valve 43 is connected to the upper end of the winding 29.

A third winding 21C of the motor is also energized from the transformer secondary windings 29 and 32 through a condenser 45 of suitable value. The motor winding 21A, 21B and 21C are so related and disposed that reaction between the magnetic fields produced by the windings 21B and 21C tends to produce rotation of the motor 21 in one direction, while the reaction between the magnetic fields produced by the windings 21A and 21C tends to rotate the motor in the opposite direction. In consequence, the motor 21 rotates in one direction or the other accordingly as the energization of the winding 21A exceeds or is less than that of the winding 21B, and the motor stalls when the windings 21A and 21B are similarly energized.

The plate circuits of the tubes 42 and 43 are connected across the transformer secondary windings 29 and 32 in a direction opposite to that in which the plate circuits of the triodes 36 and 37 are connected across the transformer secondary winding 29. In consequence, control of the conductivity of the tubes 42 and 43 in accordance with the potential drops across the resistance 39 and 40 is permitted because the condenser 41 holds over the potential drops produced across the resistances 39 and 40 in one-half cycle when the triodes 36 and 37 are conductive, to the next half cycle when the tubes 42 and 43 are conductive.

Upon an increase in the potential drop across the resistance 39 relative to that across the resistance 40, the tube 43 will be rendered more conductive than the tube 42, and the energizing current in the motor winding 21B will then exceed that in the motor winding 21A, and the motor 21 will rotate in one direction. Conversely, upon an increase in the potential drop across the resistance 40 relative to that across the resistance 39, the tube 42 will become more conductive than the tube 43, the energization of the motor winding 21A will exceed that of the winding 21B and the motor 21 will rotate in the opposite direction.

This application is a division of my prior application Serial No. 440,163, filed April 23, 1942, in which I have disclosed apparatus including a furnace temperature responsive element which may be used in lieu of the element disclosed herein to make a measuring circuit responsive to changes both in the magnitude and in the rate of change of a furnace temperature, and which comprises two thermocouples. As will be apparent, the responsive element specifically disclosed and claimed herein has certain practical advantages arising out of the fact that it includes but one thermocouple.

While in accordance with the provisions of the statutes, I have illustrated and described the best form of embodiment of my invention now known to me, it will be apparent to those skilled in the art that changes may be made in the form of the apparatus disclosed herein without departing from the spirit of my invention, as set forth in the appended claims, and that in some cases certain features of my invention may be used to advantage without a corresponding use of other features.

Having now described my invention, what I claim as new and desire to secure by Letters Patent, is:

1. In a control system, an element jointly responsive to the magnitude of a variable temperature and to the rate of change of said temperature comprising a thermocouple, a condenser connected in series with said thermocouple, a resistance connected in shunt to said thermocouple, a second resistance having one end connected to an intermediate point of the first resistance and having its other end connected to the terminal of the condenser remote from said thermocouple, a contact adjustable along said second resistor, a variable source of known voltage, means to oppose the unknown voltage between said contact and the terminal of said first resistance remote from said condenser to said source of known voltage, means responsive to the difference between said voltages, and means controlled by said last mentioned means to regulate the magnitude of said variable temperature and to adjust said known source of voltage to reduce the difference between said opposed voltages.

2. An element jointly responsive to the magnitude of a variable temperature and to the rate of change of said temperature comprising a thermocouple, a condenser connected in series with said thermocouple, a resistance connected in shunt to said thermocouple, a second resistance having one end connected to an intermediate point of the first resistance and having its other end connected to the terminal of the condenser remote from said thermocouple, a connection to said second resistance forming one output terminal of said element, and a connection to the end of the first mentioned resistance remote from said condenser and forming the second output terminal of said element.

3. An element jointly responsive to the magnitude of a variable temperature and to the rate of change of said temperature comprising a thermocouple, a condenser connected in series with said thermocouple, a resistance connected in shunt to said thermocouple, a second resistance having one end connected to an intermediate point of the first resistance and having its other end connected to the terminal of the condenser remote from said thermocouple, and a contact adjustable along said second resistor, the output terminals of said element comprising said contact and the terminal of said first resistance remote from said condenser.

WALTER P. WILLS.